United States Patent
Akamine et al.

(10) Patent No.: US 8,728,966 B2
(45) Date of Patent: May 20, 2014

(54) ALUMINUM OXYCARBIDE COMPOSITION, PRODUCTION METHOD THEREFOR, AND REFRACTORY MATERIAL

(75) Inventors: Keiichiro Akamine, Fukuoka (JP); Joki Yoshitomi, Fukuoka (JP)

(73) Assignee: Krosakiharima Corporation, Fukuoka (JP)

( * ) Notice: Subject to any disclaimer, the term of this patent is extended or adjusted under 35 U.S.C. 154(b) by 5 days.

(21) Appl. No.: 13/600,545

(22) Filed: Aug. 31, 2012

(65) Prior Publication Data

US 2013/0059719 A1 Mar. 7, 2013

(30) Foreign Application Priority Data

Sep. 2, 2011 (JP) ................................. 2011-191830

(51) Int. Cl.
 C04B 35/56 (2006.01)
 C04B 35/107 (2006.01)
(52) U.S. Cl.
 USPC .......... 501/87; 501/100; 501/127; 423/415.1; 423/440
(58) Field of Classification Search
 USPC .............. 501/87, 100, 127; 423/415.1, 440
 See application file for complete search history.

(56) References Cited

U.S. PATENT DOCUMENTS

| 4,645,720 A | * | 2/1987 | Pircher et al. ................. 428/683 |
| 8,465,720 B2 | * | 6/2013 | Akamine et al. ........... 423/415.1 |
| 2012/0035384 A1 | | 2/2012 | Akamine |

FOREIGN PATENT DOCUMENTS

| JP | 2012072006 | * | 4/2012 |
| WO | WO2010/113972 A2 | | 7/2010 |

OTHER PUBLICATIONS

Refractories, vol. 59 p. 288, 2007.
Refractories, vol. 35, p. 316, 1983.

* cited by examiner

*Primary Examiner* — Karl Group
(74) *Attorney, Agent, or Firm* — Fleit Gibbons Gutman Bongini Bianco PL; Marty Fleit; Paul D. Bianco

(57) ABSTRACT

It is an object to provide an aluminum oxycarbide composition capable of suppressing oxidation of $Al_4O_4C$ during use to maintain advantageous effects of $Al_4O_4C$ for a long time. In an aluminum oxycarbide composition comprising $Al_4O_4C$ crystals, the $Al_4O_4C$ crystals have an average diameter of 20 μm or more, based on an assumption that a cross-sectional area of each $Al_4O_4C$ crystal during observation of the aluminum oxycarbide composition in an arbitrary cross-section thereof is converted into a diameter of a circle having the same area as the cross-sectional area. This aluminum oxycarbide composition can be produced by subjecting a carbon-based raw material and an alumina-based raw material to melting in an arc furnace and then cooling within the arc furnace.

10 Claims, 4 Drawing Sheets

[TABLE1]

| Raw material (mass%) | Name | Particle size | Average particle diameter | Inventive sample1 | Inventive sample2 | Inventive sample3 | Inventive sample4 | Inventive sample5 | Inventive sample6 | Inventive sample7 | Inventive sample8 | Inventive sample9 | Comparative sample1 | Comparative sample2 |
|---|---|---|---|---|---|---|---|---|---|---|---|---|---|---|
| | Calcinated alumina | | 50μm | 90.5 | 88 | 85 | 82 | 81 | 88 | 88 | 88 | 88 | 88 | 88 |
| | Flaky graphite | 100mesh | 150μm | 9.5 | 12 | 15 | 18 | 19 | 12 | 12 | 12 | 12 | 12 | 12 |
| | Al[*1] | | | +0.5 | +0.5 | +0.5 | +0.5 | +0.5 | +0.5 | | +0.5 | | | +0.5 |
| | Si[*1] | | | | | | | | | | | +0.5 | | |
| | SiC[*1] | | | | | | | | | | | | | |
| | Mol ratio between raw materials (C/Al2O3) | | | 0.9 | 1.2 | 1.5 | 1.9 | 2.0 | 1.2 | 1.2 | 1.2 | 1.2 | 1.2 | 1.2 |
| | Mixing method | | | Mixing by V-Cone mixer for 5 min | Mixing by V-Cone mixer for 5 min | Mixing by V-Cone mixer for 5 min | Mixing by V-Cone mixer for 5 min | Mixing by V-Cone mixer for 5 min | Non-mixing | Non-mixing | Mixing by V-Cone mixer for 5 min | Mixing by V-Cone mixer for 5 min | Non-mixing | Mixing by V-Cone mixer for 5 min |
| | Variation in C component of mixture | | | 0.4 | 0.3 | 0.3 | 0.35 | 0.25 | 13.5 | 12.5 | 0.4 | 0.2 | 12 | 0.3 |
| Cooling method after melting | | | | Slow cooling | Slow cooling | Slow cooling | Slow cooling | Slow cooling | Slow cooling | Slow cooling | Slow cooling | Slow cooling | Rapid cooling | Rapid cooling |
| Characteristics of aluminum oxycarbide composition | | | | | | | | | | | | | | |
| | Apparent specific gravity | | | 3.32 | 3.18 | 2.99 | 2.83 | 2.76 | 3.25 | 3.30 | 3.27 | 3.25 | 3.34 | 3.29 |
| | Apparent porosity (%) | | | 3.7 | 3.6 | 3.6 | 3.5 | 3.5 | 3.6 | 3.6 | 3.7 | 3.8 | 3.5 | 3.8 |
| | Chemical composition | C | | 3.2 | 4.0 | 5.0 | 5.9 | 6.3 | 3.6 | 3.3 | 3.5 | 3.6 | 3.1 | 3.4 |
| | Mineral phase (mass%) | Al4O4C | | 49 | 61 | 77 | 90 | 97 | 55 | 51 | 54 | 55 | 48 | 52 |
| | | Corundum | | 50 | 38 | 22 | 9 | 2 | 44 | 47 | 44 | 43 | 51 | 46 |
| | Microstructure | Layered structure | | Presence | Presence | Presence | Presence | Presence | Presence | Presence | Presence | Presence | Absence | Absence |
| | | Al4O4C average diameter (μm) | | 20 | 300 | 500 | 800 | 1000 | 130 | 150 | 110 | 95 | 5 | 5 |
| | Thermal expansion coefficient (%) | Before heat treatment 1000°C | | 0.57 | 0.53 | 0.48 | 0.43 | 0.41 | 0.56 | 0.58 | 0.57 | 0.56 | 0.59 | 0.57 |
| | | After heat treatment 1000°C | | 0.65 | 0.60 | 0.54 | 0.47 | 0.43 | 0.64 | 0.65 | 0.65 | 0.64 | 0.74 | 0.73 |
| | Oxidation resistance (%) 1500°C × 3 hr | Al2O3 transformation rate | | 41 | 30 | 25 | 15 | 10 | 38 | 37 | 38 | 39 | 75 | 72 |

[*1]: Mass% with respect to and in addition to total 100 mass% of calcinated alumina and flaky graphite

Fig. 3

[TABLE2]

| | | | Inventive sample 10 | Comparative sample 3 | Comparative sample 4 |
|---|---|---|---|---|---|
| Raw material (mass%) | AOC composition 1 *1 | 3-1mm | 20 | | |
| | AOC composition 1 *1 | 1-0.2mm | 20 | | |
| | AOC composition 2 *2 | 3-1mm | | 20 | |
| | AOC composition 2 *2 | 1-0.2mm | | 20 | |
| | AOC composition 3 *3 | 3-1mm | | | 20 |
| | AOC composition 3 *3 | 1-0.2mm | | | 20 |
| | Sintered alumina | 3-1mm | 10 | 10 | 10 |
| | | 1-0.2mm | 20 | 20 | 20 |
| | | 0.074-0mm | 27 | 27 | 27 |
| | Metal Al | | 1 | 1 | 1 |
| | Flaky graphite | #200 | 2 | 2 | 2 |
| | Phenolic resin *4 | | +5.0 | +5.0 | +5.0 |
| Characteristics of carbon-containing refractory material | | | | | |
| | $Al_4O_4C$ content | (mass%) | 24.6 | 20.3 | 19.1 |
| | Bulk specific gravity | | 3.04 | 3.08 | 3.1 |
| | Apparent porosity | (%) | 8.5 | 8.6 | 8.8 |
| | Thermal expansion coefficient 1000°C | (%) | +0.53 | +0.57 | +0.58 |
| | Index of corrosion resistance | | 80 | 90 | 95 |
| | Index of liquid-phase oxidation resistance | | 78 | 98 | 90 |
| | Thermal shock resistance | (number of cycles) | 4 | 3 | 2.5 |

*1: Aluminum oxycarbide composition of inventive sample 2 in Table 1
*2: Aluminum oxycarbide composition of comparative sample 1 in Table 1
*3: Aluminum oxycarbide composition of comparative sample 2 in Table 1
*4: Mass% with respect to and in addition to total 100 mass% of other raw materials

Fig. 4

[TABLE 3]

| | | | Inventive sample11 | Inventive sample12 | Inventive sample13 | Inventive sample14 | Inventive sample15 | Comparative sample 5 |
|---|---|---|---|---|---|---|---|---|
| Raw material (mass%) | AOC composition 1*1 | 3-1mm | 10 | 20 | 30 | 30 | 10 | |
| | | 1-0.2mm | 10 | 20 | 40 | 40 | 5 | |
| | | 0.074-0mm | | | | 5 | 25 | |
| | Sintered alumina | 3-1mm | 20 | 10 | | | 20 | 30 |
| | | 1-0.2mm | 30 | 20 | | | 35 | 40 |
| | | 0.074-0mm | 26 | 26 | 21 | 1 | 26 | 26 |
| | Metal Al | | 1 | 1 | 1 | 1 | 1 | 1 |
| | Flaky graphite | #100 | 3 | 3 | 3 | 3 | 3 | 3 |
| | Phenolic resin *2 | | +5.0 | +5.0 | +5.0 | +5.0 | +5.0 | +5.0 |
| Characteristics of carbon-containing refractory material | | | | | | | | |
| | $Al_4O_4C$ content | (mass%) | 18.2 | 36.3 | 68.1 | 86.2 | 13.6 | 0.0 |
| | Bulk specific gravity | | 3.04 | 2.92 | 2.75 | 2.7 | 3.07 | 3.2 |
| | Apparent porosity | (%) | 8.8 | 8.7 | 8.7 | 8.6 | 8.8 | 7.8 |
| | Thermal expansion coefficient 1000°C | (%) | +0.57 | +0.49 | -0.36 | +0.33 | +0.60 | +0.66 |
| | Index of corrosion resistance | | 88 | 75 | 53 | 41 | 90 | 100 |
| | Index of liquid-phase oxidation | | 84 | 75 | 53 | 41 | 90 | 100 |
| | Thermal shock resistance | (number of cycles) | 3.5 | 4.5 | 4 | 3.5 | 2.5 | 2 |

*1: Aluminum oxycarbide composition of inventive sample 4 in Table 1
*2: Mass% with respect to and in addition to total 100 mass% of other raw materials

Fig. 5 ized at about 850° C. and transformed into alumina.

ALUMINUM OXYCARBIDE COMPOSITION, PRODUCTION METHOD THEREFOR, AND REFRACTORY MATERIAL

CROSS REFERENCE TO RELATED APPLICATION

This application claims priority under 35 U.S.C. §119 to Japanese Patent Application No. 2011-191830 on Sep. 2, 2011, the entire contents of which are incorporated herein by reference.

TECHNICAL FIELD

The present invention relates to an aluminum oxycarbide composition usable as a ceramic or refractory material or a raw material therefor, a production method for the aluminum oxycarbide composition, and a refractory material using the aluminum oxycarbide composition.

BACKGROUND ART

As an aluminum oxycarbide, the following two types: $Al_2OC$ and $Al_4O_4C$, have been known. In particular, $Al_4O_4C$ is characterized by high-temperature stability, anti-oxidation effect, excellent corrosion resistance, and low thermal expansion coefficient. It is expected as a refractory or ceramic material or a raw material therefor, in the future. Especially, $Al_4O_4C$ is expected as a raw material for a carbon-containing refractory material, such as an alumina-carbon based refractory material or a magnesia-carbon based refractory material, used as a refractory material for use with molten metal such as molten iron or steel.

As a method of producing an aluminum oxycarbide composition containing such $Al_4O_4C$ (aluminum oxycarbide), the following Non-Patent Document 1 discloses a method in which alumina and graphite are subjected to a heat treatment in an argon atmosphere. Specifically, after adding ethanol to alumina having an average particle size of 0.1 μm, and graphite reagent having a particle size of 45 μm or less, they are mixed together in an agate mortar, and then dried. A powder (2 g) of the mixture is put into a graphite crucible, and burnt at 1700° C. in a preliminarily evacuated electric furnace, while supplying argon gas thereinto. The following Non-Patent Document 2 discloses a method of producing an aluminum oxycarbide composition using an arc furnace. However, the Non-Patent Document 2 mentions that, along with an increase in amount of carbon in the aluminum oxycarbide composition obtained by the disclosed production method, $Al_4C_3$ reactive with water is formed in a larger amount.

On the other hand, the following Patent Document 1 discloses a technique for suppressing the formation of $Al_4C_3$, wherein a carbon-based raw material and alumina are homogeneously mixed together to eliminate a dispersion in C component.

However, it is known that in ambient atmosphere, $Al_4O_4C$ is oxidized at about 850° C. and transformed into alumina. Particularly, in cases where $Al_4O_4C$ having fine crystal grains is used as a raw material for a refractory material, it will be oxidized. Thus, it is difficult to maintain the advantageous effects such as oxidation resistance, corrosion resistance and low thermal expansion coefficient, for a long time.

LIST OF PRIOR ART DOCUMENTS

Patent Documents

Patent Document 1: WO 2010/113972 A

Non-Patent Documents

Non-Patent Document 1: REFRACTORIES, Vol. 59, p 288, 2007
Non-Patent Document 2: REFRACTORIES, Vol. 35, p 316, 1983

SUMMARY OF THE INVENTION

Technical Problem

The technical problem to be solved by the present invention is to provide an aluminum oxycarbide composition capable of suppressing oxidation of $Al_4O_4C$ during use to maintain advantageous effects of $Al_4O_4C$ for a long time, a production method for the aluminum oxycarbide composition, and a carbon-containing refractory material using the aluminum oxycarbide composition.

Solution to the Technical Problem

The present invention provides an aluminum oxycarbide composition comprising $Al_4O_4C$ crystals. The aluminum oxycarbide composition is characterized in that the $Al_4O_4C$ crystals have an average diameter of 20 μm or more, based on an assumption that a cross-sectional area of each $Al_4O_4C$ crystal during observation of the aluminum oxycarbide composition in an arbitrary cross-section thereof is converted into a diameter of a circle having the same area as the cross-sectional area.

Preferably, the aluminum oxycarbide composition of the present invention comprises corundum crystals, in addition to the $Al_4O_4C$ crystals. More preferably, the corundum crystals and the $Al_4O_4C$ crystals alternately lie in layered relationship. In addition to $Al_4O_4C$ and corundum, the aluminum oxycarbide composition of the present invention may contain $Al_2OC$, oxynitride such as AlON, and/or $\gamma$-$Al_2O_3$, in a small amount. Preferably, the aluminum oxycarbide composition of the present invention contains carbon in an amount of 3.2 to 6.3 mass %.

The present invention also provides a method of producing the above aluminum oxycarbide composition. The method is characterized in that it comprises subjecting a carbon-based raw material and an alumina-based raw material to melting in an arc furnace and then cooling within the arc furnace.

Preferably, in the method of the present invention, one or more selected from the group consisting of silicon carbide, boron carbide, aluminum nitride, boron nitride and a metal are added to the carbon-based raw material and the alumina-based raw material in an amount of 0.2 to 10.0 mass % with respect to and in addition to a total amount of the carbon-based raw material and the alumina-based raw material. More preferably, the raw materials, such as the carbon-based raw material, the alumina-based raw material and the silicon carbide, are homogeneously mixed together to allow a dispersion in C component to fall within ±10%.

Effect of the Invention

In the present invention, the $Al_4O_4C$ crystals have an average diameter of 20 μm or more, based on the assumption that a cross-sectional area of each $Al_4O_4C$ crystal is converted into a diameter of a circle having the same area as the cross-sectional area. This makes it possible to suppress oxidation of $Al_4O_4C$ during use to maintain advantageous effects of $Al_4O_4C$ for a long time.

BRIEF DESCRIPTION OF THE DRAWINGS

FIG. 3 shows Table 1.
FIG. 4 shows Table 2.
FIG. 5 shows Table 3.

DESCRIPTION OF EMBODIMENTS

Figure 1:
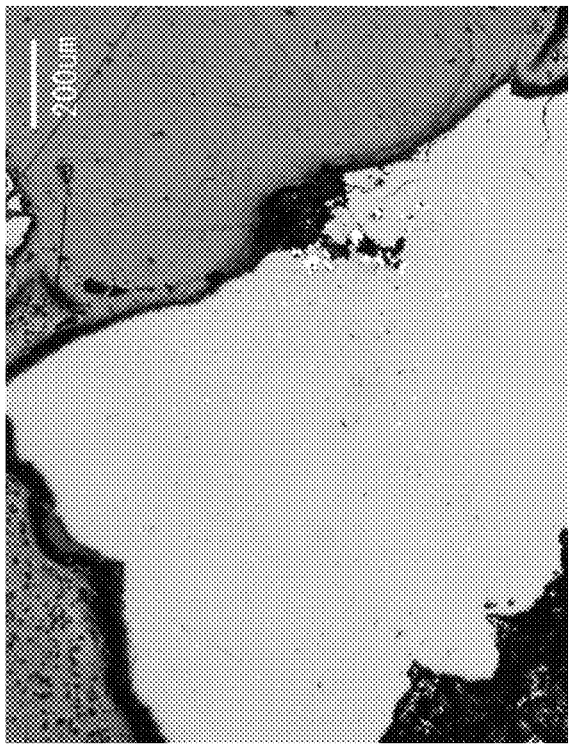
FIG. 1 is a photograph of a microstructure of an aluminum oxycarbide composition according to the present invention (inventive sample 2 in Table 1).

An aluminum oxycarbide composition of the present invention comprises $Al_4O_4C$ crystals, and is characterized in that the $Al_4O_4C$ crystals have an average diameter of 20 µm or more, based on an assumption that a cross-sectional area of each $Al_4O_4C$ crystal during observation of the aluminum oxycarbide composition in an arbitrary cross-section thereof is converted into a diameter of a circle having the same area as the cross-sectional area.

$Al_4O_4C$ crystals in an aluminum oxycarbide composition belong to the orthorhombic system, so that they have a columnar or prismatic structure, in many cases. Although a crystal shape in microscopic observation varies depending on in what cross-section the observation is performed, each of the $Al_4O_4C$ crystals in the present invention has a length of about 10 to 2000 µm in a short-side direction, as measured by observing columnar structures.

As used in this specification, the term "average diameter based on the assumption that a cross-sectional area of each $Al_4O_4C$ crystal is converted into a diameter of a circle having the same area as the cross-sectional area" means an average value of diameters based on an assumption that respective cross-sectional areas of the $Al_4O_4C$ crystals are cumulatively added in descending order of cross-sectional area until a cumulative addition value becomes greater than a half of the entire area of an observation field of view during microscopic observation of the aluminum oxycarbide composition, and a cross-sectional area of each of a plurality of specific ones of the $Al_4O_4C$ crystals subjected to the cumulative addition is converted into a diameter of a circle having the same area as the cross-sectional area. A cross-sectional area of each $Al_4O_4C$ crystal, and a diameter of a circle converted from the cross-sectional area, can be calculated using image processing software.

For example, the aluminum oxycarbide composition comprising $Al_4O_4C$ crystals having an average diameter of 20 µm or more can be produced by subjecting a carbon-based raw material and an alumina-based raw material to melting in an arc furnace, and then cooling within the arc furnace, i.e., slow cooling.

Heretofore, in the field of grinding materials or the like, in a method of producing an aluminum oxycarbide composition by means of arc melting, a mixture of raw materials is subjected to melting in an arc furnace, and a resulting molten mixture is cast into a die outside the arc furnace to form an ingot. However, in this production method, after melting in the arc furnace, the molten mixture is cast into the die outside the arc furnace. Thus, a cooling rate after the melting becomes greater than 10° C./min, i.e., the molten mixture is subjected to rapid cooling, so that resulting $Al_4O_4C$ crystals are finely formed to have an average diameter of less than 10 µm.

Differently, in the case where a mixture of raw materials is subjected to melting in an arc furnace and then cooling within the arc furnace without any transfer, the cooling rate becomes equal to or less than 10° C./min, i.e., a molten mixture is subjected to slow cooling, so that $Al_4O_4C$ crystals grow in the course of the slow cooling to have an average diameter of 20 µm or more. In some cases, in addition to $Al_4O_4C$ crystals, the aluminum oxycarbide composition comprises corundum crystals, and further contains $Al_2OC$, oxynitride such as AlON, and/or $\gamma$-$Al_2O_3$, in a small amount.

As above, the $Al_4O_4C$ crystals have an average diameter of 20 µm or more. This makes it possible to suppress oxidation of $Al_4O_4C$ during use to maintain advantageous effects of $Al_4O_4C$ for a long time. In addition, when the aluminum oxycarbide composition contains corundum crystals, the corundum crystals can function as barrier to suppress the oxidation of $Al_4O_4C$, so that it becomes possible to more reliably maintain the advantageous effects of $Al_4O_4C$ for a long time. Although an upper limit of the average diameter of the $Al_4O_4C$ crystals is not particularly limited, it is preferably set to 3 mm or less, because a particle size usable as an aggregate raw material for a refractory material is generally about 3 mm in a coarse particle fraction.

Preferably, the aluminum oxycarbide composition of the present invention has a layered microstructure in which the $Al_4O_4C$ crystals and the corundum crystals alternately lie in layered relationship. As mentioned above, it is known that $Al_4O_4C$ is oxidized in an oxidation atmosphere at 850° C. and transformed into alumina. If $Al_4O_4C$ is oxidized and transformed into alumina, it becomes impossible to obtain an anti-oxidation effect, a corrosion resistance enhancement effect and an effect based on low thermal expansion coefficient, which are innate features of $Al_4O_4C$. In the microstructure where corundum crystals lie in layers, the corundum crystal layers are effective in protecting $Al_4O_4C$ crystals from oxidation, and highly effective in suppressing oxidation of the entire aluminum oxycarbide composition, so that it becomes possible to maintain the above features of $Al_4O_4C$ for a long time.

Preferably, the aluminum oxycarbide composition of the present invention contains carbon in an amount of 3.2 to 6.3 mass %. This carbon content gives an indication of an amount of $Al_4O_4C$ contained in an aluminum oxycarbide composition. Specifically, a theoretical carbon content in $Al_4O_4C$ is 6.52 mass %. When a carbon content in an aluminum oxycarbide composition is 6.52 mass %, an $Al_4O_4C$ content in the aluminum oxycarbide composition is 100 mass %. If the carbon content in the aluminum oxycarbide composition is less than 3.2 mass %, an amount of $Al_4O_4C$ is reduced, so that it is likely that the advantageous effects of $Al_4O_4C$ cannot be sufficiently obtained. On the other hand, if the carbon content is greater than 6.3 mass %, formation of aluminum carbide susceptible to hydration becomes more likely to occur, resulting in poor microstructural stability. Moreover, an amount of corundum crystals becomes reduced or zero, so that an oxidation suppression effect of $Al_4O_4C$ is deteriorated, which causes difficulty in maintaining $Al_4O_4C$ in an oxidation atmosphere for a long time.

As mentioned above, the aluminum oxycarbide composition of the present invention may be produced by subjecting a carbon-based raw material and an alumina-based raw material to melting in an arc furnace and then cooling (slowly cooling) within the arc furnace.

As the carbon-based raw material, it is possible to use a carbon-based raw material which is commonly used as a raw material for a refractory material. For example, the usable carbon-based raw material includes pitch, graphite, coke, carbon black and powdered organic resin. Among them, as graphite, it is possible to use flaky graphite, earthy (amorphous) graphite, expanded graphite and/or artificial graphite.

A content rate of carbon (C content rate) of the carbon-based raw material may be 90 mass % or more, preferably, 95 mass % or more.

As the alumina-based raw material, it is possible to use an alumina-based raw material which is commonly used as a raw material for a refractory material. For example, the usable alumina-based raw material includes fused alumina, sintered alumina and/or calcinated alumina, which are prepared by artificially refining natural bauxite or the like through a Bayer process or the like, to allow an $Al_2O_3$ purity to become 95 mass % or more. It is also possible to use China bauxite, bauxite, clay and/or brick dust to an extent that an $Al_2O_3$ purity in the entire alumina-based raw material is preferably 90 mass % or more, more preferably, 95 mass % or more.

In the present invention, a refractory material containing carbon and alumina, such as an alumina-carbon based or alumina-graphite based refractory material, may be used as the carbon-based raw material and the alumina-based raw material. In this case, a total content of carbon and alumina with respect to the entirety of the carbon-based raw material and the alumina-based raw material is adjusted to 90 mass % or more, preferably, 95 mass % or more. Further, it is preferable that a mole ratio of carbon to alumina ($C/Al_2O_3$) in the entirety of the carbon-based raw material and the alumina-based raw material is adjusted to a range of 0.8 to 2.0.

$Al_4O_4C$ is formed through the following reaction (1). Thus, ideally, a mole ratio of the carbon-based raw material to the alumina-based raw material is set to 1.5.

$$2Al_2O_3 + 3C = Al_4O_4C + 2CO \qquad (1)$$

The carbon content ($Al_4O_4C$ content) in the aluminum oxycarbide composition can be controlled to some extent by adjusting a content of the carbon-based raw material. However, in typical melting conditions, carbon is oxidized to form a large amount of corundum ($Al_2O_3$), although the reason is not clear. Moreover, local formation of $Al_4C_3$ and other problem occur.

It is believed that the local formation of $Al_2O_3$ is due to an influence of a melting atmosphere depending on a type of arc furnace, a voltage condition, etc. Considering practical mass production, it is necessary to use a large arc furnace and perform melting at high voltage or electric power. In this case, the melting atmosphere becomes an oxidation atmosphere. Thus, it is considered that $Al_4O_4C$ is less likely to be formed, and formation of corundum ($Al_2O_3$) is accelerated.

Therefore, preferably, one or more selected from the group consisting of silicon carbide, boron carbide, aluminum nitride, boron nitride and a metal, are added to the carbon-based raw material and the alumina-based raw material in an amount of 0.2 to 10.0 mass % with respect to and in addition to a total amount of the carbon-based raw material and the alumina-based raw material, whereafter the obtained mixture is subjected to melting in the arc furnace.

Based on adding an antioxidant such as a metal in the above manner, it becomes possible to suppress oxidation of the carbon-based raw material due to an atmosphere during melting and cooling, to efficiently induce reaction between and melting of the carbon-based raw material and the alumina-based raw material, although details of the mechanism is unclear. A melting point of $Al_4O_4C$ is in a high-temperature region of 1850° C. or less. On the other hand, it is considered that formation of $Al_4O_4C$ occurs at an appropriate temperature ranging from 1000° C. (which would cause sintering reaction) to 1850° C. (which causes formation of a liquid phase). Thus, the metal to be added in the present invention is required to have oxygen affinity stronger than that of carbon, in a temperature range of 1000° C. or more.

It is believed that the added metal in the present invention reacts with carbon monoxide generated by a reaction between alumina and carbon, e.g., an aftermentioned reaction (2), to immobilized carbon which would otherwise disappear as the carbon monoxide to exert an effect of increasing the yield of carbon.

When silicon is added as the metal, the following reaction (2) occurs.

$$2CO + Si = SiO_2 + 2C \qquad (2)$$

The metal to be added in the present invention is used in the form of a metal power or a solid metal blank, to suppress oxidation of the carbon-based raw material and $Al_4O_4C$ due to an atmosphere during melting and cooling (i.e., during production). Therefore, a metal is used which has oxygen affinity stronger than that of carbon, in a temperature range equal to or greater than 500° C. at which oxidation of carbon starts, preferably, equal to or greater than 1000° C. which would cause formation of $Al_4O_4C$. Specifically, for example, it is possible to use one or more selected from the group consisting of Si, Mn, Al, Ca, Mg, Zr, and Ti. Further, an alloy containing one or more of the above metals may also be used. Although a purity of the metal or alloy is not particularly limited, the metal or alloy preferable has a purity of 90% or more.

In another embodiment of the present invention, instead of or in addition to a metal, one or more selected from the group consisting of silicon carbide, boron carbide, aluminum nitride and boron nitride are added.

It is assumed that each of silicon carbide (SiC), boron carbide ($B_4C$), aluminum nitride (AlN) and boron nitride (BN) exerts a function of suppressing oxidation of the carbon-based raw material during melting and cooling due to an atmosphere, to efficiently induce reaction between and melting of the carbon-based raw material and the alumina-based raw material, as with the metal, although details of the mechanism is unclear. For example, in the case of adding SiC, it is assumed that carbon is efficiently eluted therefrom into the molten raw materials to contribute to formation of $Al_4O_4C$.

As the silicon carbide, boron carbide, aluminum nitride or boron nitride to be added in the present invention, it is possible to use a type which is commonly used as an antioxidant for carbon, or the like, in the technical field of refractory materials. Although a purity thereof is not particularly limited, it preferable has a purity of 90% or more.

Preferably, the raw materials in the present invention, such as the carbon-based raw material, the alumina-based raw material, the metal and the silicon carbide, are homogeneously mixed together to allow a dispersion in C component to fall within ±10%. Based on preliminarily homogeneously mixing the raw materials, it becomes possible to increase the yield of $Al_4O_4C$, while suppressing formation of $Al_4C_3$.

As used here, the term "homogeneously mixed (homogeneous mixing)" means a state in which dispersion is significantly reduced when the mixture of the raw materials is sampled. In the present invention, an index of the homogeneous mixing is represented by a dispersion in C component. As used here, the term "dispersion in C component" means a ratio (%) of a difference between a specific one of a plurality of analysis values, and a preset target value of the C component, to the preset target value, wherein the plurality of analysis values are obtained by taking a sample three times from the mixture of the raw materials, and analyzing respective C components of the sampled mixtures, and the specific analysis value has the largest difference with the preset target value. The dispersion in C component is set to fall, preferably, within ±10%, more preferably within ±5%. In order to achieve the homogeneous mixing, it is preferable to perform mixing using a commercially available powder mixer. The term "preset target value (%)" means [a ratio (%) of the carbon-based raw material to the mixture of the raw materials]×[a content rate (%) of C component in the carbon-based raw material], wherein the content rate (%) of the C component in the carbon-based raw material is a measurement value before the mixing.

As the arc furnace, it is possible to use a type which is commonly used to melt a refractory material such as magnesia or alumina so as to produce a refractory material. In the arc furnace, the mixture of the carbon-based raw material and the alumina-based raw material with other raw material added thereto according to need, such as the metal, is melted. Specifically, the mixture is melted at a temperature of about 1850 to 2400° C. After the melting, the molten mixture is cooled to form an ingot, and the ingot is pulverized to obtain an aluminum oxycarbide composition.

In the present invention, a mole ratio of carbon in the carbon-based raw material to alumina in the alumina-based raw material ($C/Al_2O_3$) may be controlled in a range of 0.8 to 2.0 to control a content rate of $Al_4O_4C$.

The aluminum oxycarbide composition of the present invention can be suitably used as a raw material for a refractory material, particularly, aggregate (particle size: 0.2 mm or more). When the aluminum oxycarbide composition of the present invention is used as a raw material for a refractory material, it is preferably contained in an amount of 15 to 95 mass %. If the content of the aluminum oxycarbide composition is less than 15 mass %, it is likely that the advantageous effects of the aluminum oxycarbide composition cannot be sufficiently obtained. On the other hand, if the content is greater than 95 mass %, an amount of carbon to be added in order to reduce an elastic modulus, an amount of a metal to be added as a anti-oxidation or sintered material or an antioxidant such as a metal, a carbide, a nitride or a boride, and an amount of phenolic resin to be added as a binder, are restricted, so that it becomes difficult to obtain sufficient characteristics as a refractory material, such as strength, elastic modulus and oxidation resistance.

EXAMPLES

Aluminum oxycarbide compositions were produced by the method of the present invention designed to subject a mixture of raw materials to melting in an arc furnace and then cooling (slow cooling) within the arc furnace, and by the conventional method designed to subject the mixture to melting in an arc furnace, and then a resulting molten mixture is cast into a die outside the arc furnace and subjected to rapid cooling, and characteristics thereof were evaluated. A result of the evaluation is illustrated in the following Table 1.
TABLE 1 is shown in FIG. 3.

At respective ratios illustrated in Table 1, calcinated alumina ($Al_2O_3$ component: 99.9 mass %) and flaky graphite (C component: 99 mass %) were weighted by a total amount of 500 kg. As for the inventive samples 1 to 6, 8 and 9 and the comparative sample 2, Al, Si or SiC was added thereto with respect to and in addition to a total 100 mass % of the calcinated alumina and the flaky graphite As for the inventive samples 1 to 5, 8 and 9 and the comparative sample 2, the above raw materials were blended, and mixed together by a V-Cone mixer for 5 minutes. As for the inventive samples 6 and 7 and the comparative sample 1, the homogeneous mixing treatment was not performed. The dispersion in C component of the raw material mixture was evaluated by the aforementioned method.

The raw material mixture was put in a 1000 KVA arc furnace, and subjected to melting. Then, the molten mixture in each of the inventive samples was subjected to slow cooling without transfer to the outside, and the molten mixture in each of the comparative samples was cast into a die outside the arc furnace. In this way, ingots of inventive and comparative aluminum oxycarbide compositions were produced. A cooling rate in each of the inventive samples was set to about 0.7° C./min, and a cooling rate in each of the comparative samples was set to about 15° C./min.

Each of the produced ingots of the aluminum oxycarbide compositions was subjected to pulverization and particle size regulation, and then an apparent porosity and an apparent specific gravity were measured according to JIS-R2205. In regard to a chemical composition, a C content was measured according to JIS-R2011. The C content was evaluated by a total carbon amount which is a sum of free carbon described in JIS-R2205, and carbon in silicon carbide. Specifically, considering that oxidation of $Al_4O_4C$ starts at a temperature of 820° C. or more, the carbon content was evaluated by a sum of a carbon amount measured at 900° C. and a carbon amount in silicon carbide measured at 1350° C. The theoretical C content in $Al_4O_4C$ is 6.52 mass %.

A mineral phase was quantified by an internal reference method based on X-ray diffractometry.

A microstructure of the aluminum oxycarbide composition was observed by a microscope. As mentioned above, an average diameter of $Al_4O_4C$ crystals means an average value of diameters based on the assumption that respective cross-sectional areas of the $Al_4O_4C$ crystals are cumulatively added in descending order of cross-sectional area until a cumulative addition value becomes greater than a half of the entire area of an observation field of view during microscopic observation of the aluminum oxycarbide composition, and a cross-sectional area of each of a plurality of specific ones of the $Al_4O_4C$ crystals subjected to the cumulative addition is converted into a diameter of a circle having the same area as the cross-sectional area.

A rectangular columnar sample having a size of 8×8×12 mm was directly cut from each of the ingots, and a thermal expansion coefficient was measured in an ambient atmosphere up to 1000° C. by thermo-mechanical analysis (TMA). Further, in order to evaluate a thermal expansion coefficient maintenance ratio after oxidation of the aluminum oxycarbide composition, the rectangular columnar sample of 8×8×12 mm was subjected to an oxidation treatment under an ambient atmosphere at 1500° C. for 3 hours, and the thermal expansion coefficient was measured in an ambient atmosphere up to 1000° C. by thermo-mechanical analysis (TMA) in the same manner.

Alumina transformation rate=[($Al_4O_4C$ amount before oxidation test−$Al_4O_4C$ amount after oxidation test)/$Al_4O_4C$ amount before oxidation test]×100    [Formula 1]

In view of the fact that when $Al_4O_4C$ is oxidized, it is transformed to alumina (corundum), oxidation resistance was evaluated by calculating an alumina transformation rate indicative of an $Al_4O_4C$ decrease rate (corundum increase rate). The alumina transformation rate is expressed as the following formula:

Specifically, a sample having a size of 10×10×10 mm was cut from each of the ingots, and subjected to an to an oxidation treatment under an ambient atmosphere at a temperature of 1500° C. for 3 hours using a rotary furnace. Then, a carbon content was measured, and the alumina transformation rate was calculated by comparison with a carbon content preliminarily measured before the oxidation test. The aluminum oxycarbide composition primarily consists of corundum and $Al_4O_4C$, and contains other components in an extremely small amount. Thus, an $Al_4O_4C$ content can be calculated by measuring a carbon content. Therefore, carbon contents before and after the oxidation test were measured to derive $Al_4O_4C$ contents before and after the oxidation test, and calculate the alumina transformation rate.

As is evident from Table 1, all of the inventive samples in which the average diameter of $Al_4O_4C$ is 20 μm or more, are excellent in oxidation resistance. On the other hand, the comparative samples in which the average diameter of $Al_4O_4C$ is less than 10 μm, are inferior in terms of oxidation resistance.

In regard to a thermal expansion coefficient of the aluminum oxycarbide composition oxidized at 1500° C. in an ambient atmosphere, all of the inventive samples 1 to 9 in which the average diameter of $Al_4O_4C$ is 20 μm or more, maintain a low thermal expansion coefficient. On the other hand, the comparative samples 1 and 2 in which the average diameter of $Al_4O_4C$ is less than 10 μm, have an increased thermal expansion coefficient.

A comparison between the inventive sample 2 and the inventive sample 6 shows that the yield (content rate) of $Al_4O_4C$ is enhanced by preliminarily homogenously mixing the raw materials. However, from a comparison between the inventive sample 2 and the comparative sample 2, it is proven that an effect of enhancing the oxidation resistance cannot be obtained only by the preliminarily homogenous mixing of the raw materials.

A comparison between each of the inventive samples 6, 8 and 9 and the inventive sample 7 shows that the yield (content rate) of $Al_4O_4C$ is enhanced by adding an antioxidant such as a metal.

Figure 2:
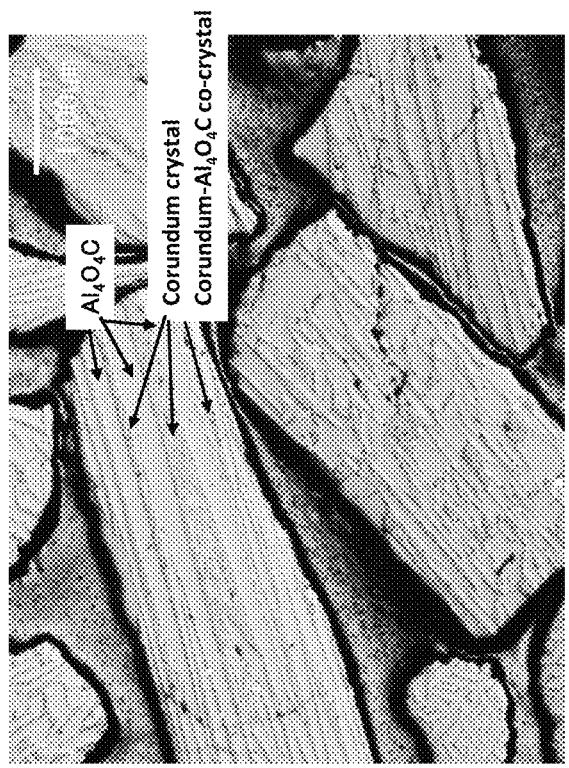
FIG. 2 is a photograph of a microstructure of a conventional aluminum oxycarbide composition (comparative sample 1 in Table 1).

FIG. 1 illustrates a microstructure of the inventive sample 2, and FIG. 2 illustrates a microstructure of the comparative sample 1. It is proven that, in the inventive sample 2, columnar $Al_4O_4C$ crystals having a short diameter of about 50 to 250 μm, and columnar corundum crystals having a short diameter of about 30 to 300 μm or corundum-$Al_4O_4C$ co-crystals, grow while alternately lying in layered relationship. On the other hand, in the comparative sample 1, each of $Al_4O_4C$ crystals and corundum crystals is finely formed to have an average diameter of less than 10 μm.

Then, three types of carbon-containing refractory materials were produced by using the aluminum oxycarbide compositions of the inventive sample 2 and the comparative samples 1 and 2, and characteristics thereof were evaluated. A result of the evaluation is illustrated in the following Table 2. TABLE 2 is shown in FIG. 4.

The various raw materials were blended at respective ratios illustrated in Table 2, and, after adding a phenolic resin as a binder thereto in an amount of 5 mass % with respect to and in addition to a total amount of the raw materials, subjected to mixing and shaping. Then, the resulting shaped body was heated at a temperature of 300° C. to produce a carbon-containing refractory material.

The produced carbon-containing refractory material was evaluated in terms of bulk specific gravity, apparent porosity, thermal expansion coefficient, corrosion resistance, oxidation resistance, liquid-phase oxidation resistance and thermal shock resistance.

The bulk specific gravity and the apparent porosity were evaluated by the method described in JIS-R2205. The thermal expansion coefficient was evaluated in a nitrogen atmosphere up to 1000° C. by the non-contact method described in JIS-R2207-1.

The corrosion resistance was evaluated by melting an SS material and an iron oxide powder using a high-frequency induction furnace to prepare synthetic slag having a CaO/$Al_2O_3$ ratio of 2.2, and subjecting a sample to a corrosion resistance test in the synthetic slag at 1600° C. for 3 hours to measure a wear amount. Then, the obtained measurement value was converted into an index value on an assumption that a wear amount of the comparative sample 5 in the aftermentioned Table 3 is 100. A smaller value indicates better corrosion resistance.

The liquid-phase oxidation resistance was evaluated by melting an SS material using a high-frequency induction furnace, and subjecting a sample to a liquid-phase oxidation resistance test in the molten steel at 1600° C. for 5 hours to measure a thickness of an oxide layer on a steel bath portion. Then, the obtained measurement value was converted into an index value on an assumption that a thickness of an oxide layer of the comparative sample 5 in the aftermentioned Table 3 is 100. A smaller value indicates better liquid-phase oxidation resistance.

The thermal shock resistance was evaluated by repeating a cycle of immersing a sample in molten steel at 1600° C. for 3 minutes and subjecting the sample to air cooling, to determine quality based on the number of cycles before occurrence of peeling (spalling). Specifically, the thermal shock resistance was evaluated by an average cycle number in two samples before the occurrence of peeling. A larger value indicates better thermal shock resistance.

Table 2 shows that the inventive sample 10 using the aluminum oxycarbide composition of the inventive sample 2 in Table 1 is superior to the comparative samples 3 and 4 using respective ones of the aluminum oxycarbide compositions of the comparative samples 1 and 2 in Table 1, in terms of corrosion resistance, liquid-phase oxidation resistance and thermal shock resistance. In the inventive sample 10, $Al_4O_4C$ was maintained for a long time without being oxidized even under the high-temperature testing condition. It is considered that the result comes from excellent corrosion resistance based on improvement in wettability with slag, which is one feature of $Al_4O_4C$. Further, in view of the fact that $Al_4O_4C$ is also maintained in the liquid-phase oxidation test, it is believed that oxidation resistance in a high temperature region is enhanced. It is considered that the effect of enhancing liquid-phase oxidation resistance comes from a high oxidation suppression effect based on a dense $Al_2O_3$ layer formed through a reaction between $Al_4O_4C$ and FeO. Further, in view of the fact that $Al_4O_4C$ is maintained under the repetitive high-temperature heat treatments in the thermal shock resistance test, it is believed that spalling resistance is improved by the low thermal expansion coefficient-based effect. In contrast, each of the aluminum oxycarbide compositions of the comparative samples 3 and 4 were oxidized and transformed into $Al_2O_3$ under the high-temperature testing condition, within a short period of time. It is considered that the result is due to deterioration in corrosion resistance caused by deterioration in wettability with slag, deterioration in oxidation resistance, and deterioration in spalling resistance caused by increase in thermal expansion coefficient.

Then, a carbon-containing refractory material using the aluminum oxycarbide composition of the inventive sample 5 in Table 1 was produced, and characteristics thereof were evaluated. A result of the evaluation is illustrated in the following Table 3. In Table 3, the comparative sample 5 is a carbon-containing refractory material using no aluminum oxycarbide composition.

TABLE 3 is shown in FIG. 5.

Various raw materials were blended at respective ratios illustrated in Table 3, and carbon-containing refractory materials were produced by the same method as that for the samples in Table 2. Characteristics of each of the produced carbon-containing refractory materials were evaluated by the same method as that for the samples in Table 2.

All of the inventive samples were superior to the comparative sample 5 in terms of corrosion resistance, liquid-phase oxidation resistance and thermal shock resistance.

What is claimed is:

1. An aluminum oxycarbide composition comprising $Al_4O_4C$ crystals, wherein the $Al_4O_4C$ crystals have an average diameter of 20 μm or more, based on an assumption that a cross-sectional area of each $Al_4O_4C$ crystal during observation of the aluminum oxycarbide composition in an arbitrary cross-section thereof is converted into a diameter of a circle having the same area as the cross-sectional area.

2. The aluminum oxycarbide composition of claim 1, further comprising corundum crystals.

3. The aluminum oxycarbide composition of claim 2, wherein the $Al_4O_4C$ crystals and the corundum crystals alternately lie in a layered relationship.

4. The aluminum oxycarbide composition of claim 1, which contains carbon in an amount of 3.2 to 6.3 mass %.

5. A method of producing the aluminum oxycarbide composition of claim 1, wherein the method comprises subjecting a carbon-based raw material and an alumina-based raw material to melting in an arc furnace and then cooling within the arc furnace.

6. The method of claim 5, wherein one or more selected from the group consisting of silicon carbide, boron carbide, aluminum nitride, boron nitride and a metal are added to the carbon-based raw material and the alumina-based raw material in an amount of 0.2 to 10.0 mass % with respect to and in addition to a total amount of the carbon-based raw material and the alumina-based raw material, whereafter the obtained mixture is subjected to melting in the arc furnace and then cooling within the arc furnace.

7. The method of claim 6, wherein the raw materials are homogeneously mixed together to allow a dispersion in C component to fall within ±10%.

8. A refractory material which contains, as aggregate, the aluminum oxycarbide composition of claim 1.

9. A refractory material which contains the aluminum oxycarbide composition of claim 1, in an amount of 15 to 95 mass %.

10. The composition of claim 1, wherein the composition is formed by melting in an arc furnace and then cooling within the arc furnace with a cooling rate no more than 10° C./min.

* * * * *